May 2, 1944.　　　　J. P. FABER　　　　2,348,062
WELDING POSITIONER AND MANIPULATOR
Filed Dec. 23, 1942　　　3 Sheets-Sheet 2
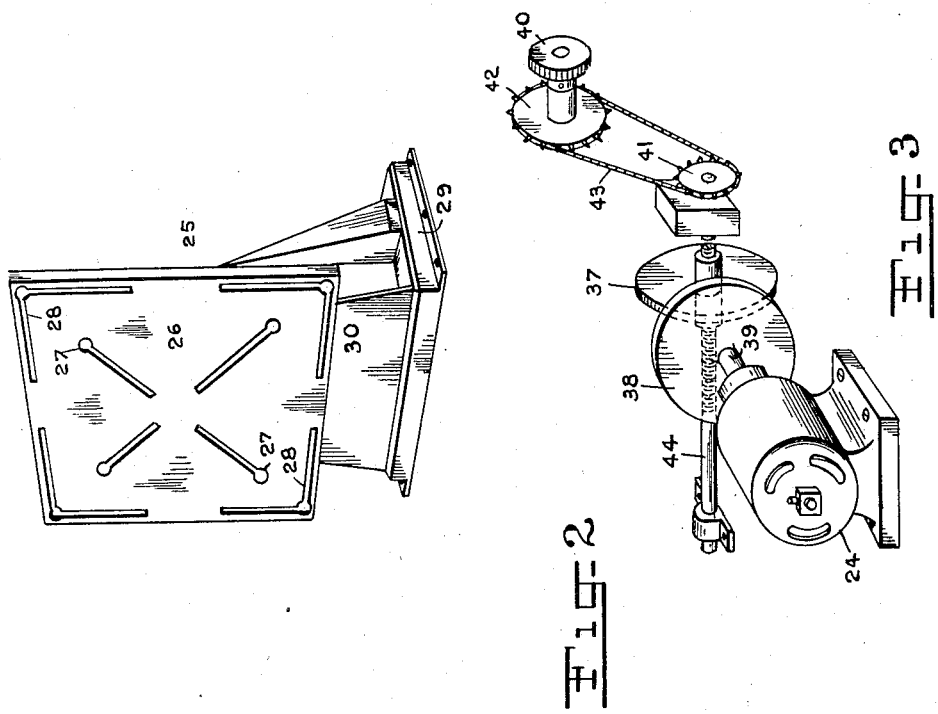
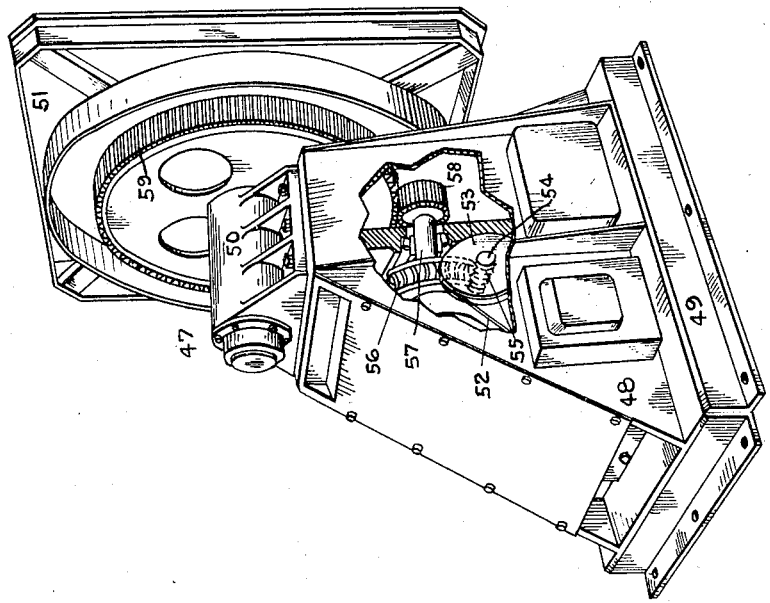
INVENTOR.
John P. Faber INVENTOR.
John P. Faber.

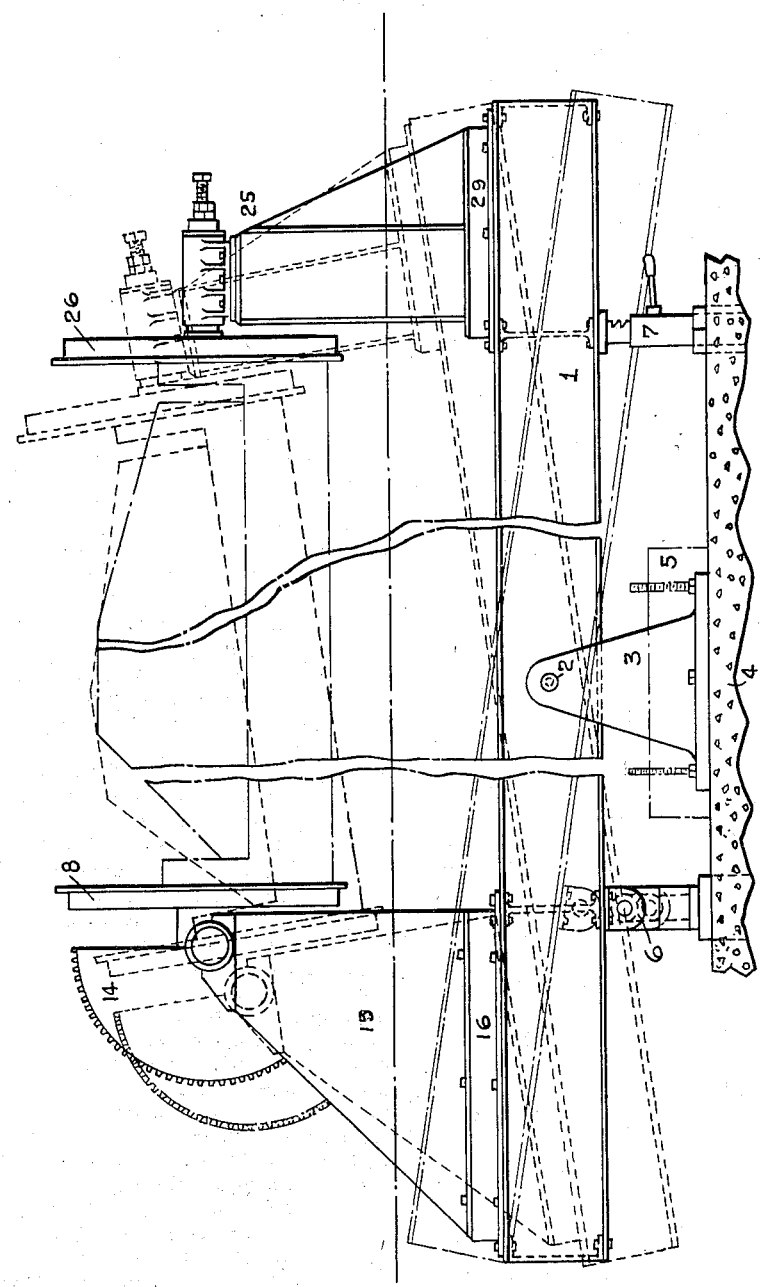

Patented May 2, 1944

2,348,062

UNITED STATES PATENT OFFICE 2,348,062

WELDING POSITIONER AND MANIPULATOR

John P. Faber, Dunellen, N. J., assignor to Ransome Machinery Company, Plainfield, N. J., a corporation of New Jersey Application December 23, 1942, Serial No. 469,925

5 Claims. (Cl. 29—89)

The improvements relates to positioners and manipulators for articles of various kinds during welding and similar operations thereon, and which are designed to support, position and move the said work in such a manner that the operations may be performed quickly and effectively and without requiring the operator to assume disadvantageous, unsafe or awkward positions. They are in the nature of improvements in the mechanism of U. S. Patent No. 2,224,958 to Faber, granted December 17, 1940, to which reference may be had for some details of construction not herein fully shown and described.

Among the objects of the improvements are the provision in an apparatus of this kind of greater adjustability to the various types, sizes and structures of the work and their variations in weight as well as variations in the character of the work to be done thereon; to increase the strength, compactness, balance, convenience, adjustability and efficiency of the apparatus, and to improve the quality of the work performed with its aid while at the same time expediting its performance. Work of this kind varies in weight from a few pounds to upwards of twenty tons and from very simple to extremely complex structures. It also requires a great variety of treatment and frequently calls for weldments in inaccessible places. To devise a positioner and manipulator to meet all the conditions encountered and enable the operator to perform his work with efficiency, safety and dispatch, despite the widely varying character of the work and the difficulties of the operations to be performed thereon, is the primary object of these improvements.

The improvements are illustrated in the accompanying drawings in which—

Fig. 1 is a diagrammatic side elevation of an apparatus embodying the improvements;

Fig. 2 is a perspective view, with parts broken away to disclose the interior, of a modified form without the connecting base frame;

Fig. 3 is an enlarged perspective of one of the variable speed transmissions of the motors;

Figure 5:
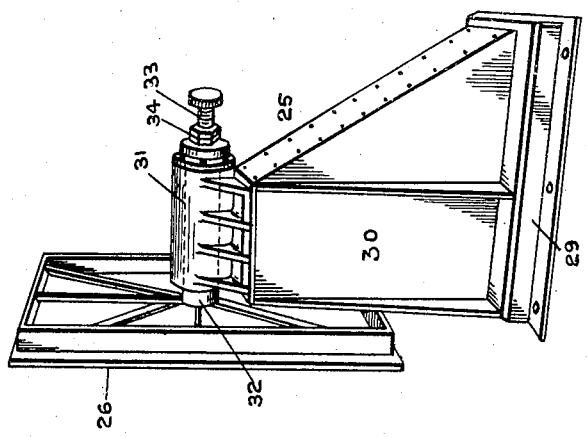
Fig. 5 is a side perspective view of the auxiliary head of Fig. 1.

In the said drawings, 1 represents the main base frame which is composed of longitudinal flanged spaced beams connected by cross pieces at their ends and at intermediate points. This frame is mounted to rock on a pivot bar 2 running through the beams and having its ends supported in standards 3, one at each end, which are in turn fixed to the concrete floor or base 4. The standards may be elevated to raise the entire structure by interposing blocks such as the block 5, indicated in dotted lines in Fig. 1, interposed between them and the said floor.

The frame 1 is supported at a point spaced from the standard 3 by a double acting jack by which it is adapted to be rocked in a vertical plane to raise one end and lower the other and vice versa, while on the opposite side of the standard it is supported in all positions to which it may be rocked by the extensible and retractable post or jack 7. Both jacks are set in and fixed to the floor or fixed base 4.

It will be seen that this construction gives a number of position changes or adjustments for the rocking base and the heads and work thereon, viz: A tilted position in which one end is raised and the other lowered, an elevated position in which they may be horizontal or tilted and a position in which one end is maintained in any desired elevation or close to the floor while the other is elevated or depressed within the limits of movement permitted by jack 6. Jack 7 may be omitted, however, when the load is not too heavy so as to give more play to that end of the frame 1. The extent of the tilting adjustment may also be increased by elevating the pivot 1.

The rotating and tilting head consists essentially of a table 8 with a central pivot post or king pin 9 fixed thereto at its center and normal thereto, bearings 10 and 11 for support and rotation of the post in the sleeve 12, a yoke 13 mounted between the segments 14 which are in turn mounted to rotate in the side frames 15, 15, and these side frames are fixed to a base 16 for the head having flanges 17 by which it is secured to the rocking base 1 when employed therewith. The table 8 has an annular rack 18 on its under side concentric with its pivot 10 and in mesh with the small gear 19 by which the table is rotated, and the segments 14 have gear teeth 20 on their peripheries which mesh with the small gears 21 on the driving shaft 22, by which the segments, table and intermediate members are rocked through an arc of 180° or less in two directions to adjust the table and position the work.

The motors for tilting and rotating the table are 23 and 24 respectively and are mounted on the base 16 between the side frames 15 so that they are housed under the table when it is in horizontal position and are located below the table operating connections. They are also between the segment gears 14. The variable speed transmission gears (Fig. 3) are also mounted on the base 16 and between the side frames 15 at the rear of their motors so that the power and transmission units are all housed within the machine and at its lower part and are not only protected thereby and leave a clear space around it but in turn anchor and increase the stability of the said machine. In this manner a relatively small, compact and well balanced machine is provided and the weight of the work mounted on and projecting laterally from the table is counterbalanced.

The head above described is adapted to be used without the auxiliary head 25 and may be used without a tilting or elevating base and mounted on the floor of the plant in which it is employed or on a small fixed elevating base. It is, however, adapted to be used with the auxiliary head and mounted on a rocking and adjustable frame such as the frame 1, as shown in Fig. 1, and when so used it not only rotates the work but through it the auxiliary frame at the opposite end to which the work is also secured, by means of the radial and angular slots 27 and 28 in its plate 26. The table 8 is provided with similar slots (not shown), and they are adapted to receive clamping means secured to the work thus securing the work to the tables. When thus employed, the table 8 is tilted to a vertical position and in plane parallel with the table 26. The work is then mounted between the two tables in the desired position, and after that the table 8 is not rocked. Rocking movement, however, is secured in this case through the main rocking base frame 1, on which both heads are secured.

The auxiliary head 25 has a base 29 by which it is mounted on the main base frame 1 and an upright frame 30 having a sleeve 31 secured to its top and in which the shaft 32 rotates. This shaft has a reduced end portion 33 which is threaded and is provided with locking nuts 34, so that the table 26 can be adjusted horizontally to a limited extent to facilitate the mounting of the work between it and the table 8. Both heads can be adjusted along the rocking base frame 1 by removing the bolts by which they are secured thereto, sliding them to a new position and then securing them again by the bolts.

The yoke 13 and segment 14 are securely united as indicated at 35, and the ends of the yoke are mounted in suitable bearings such as 36 in the side frames 15, so that they and the table 8 can be oscillated by the shaft 22 connected with the motor 23 by variable speed gears such as those shown in Fig. 3, more fully described and shown in the said Faber patent, the reversal of movements being accomplished by moving the driven disk 37 across the face of the driving disk 38 to the opposite side of the motor shaft 39. The shaft 44 of disk 37 is operatively connected with the small gear 40 through sprockets 41 and 42 and a sprocket chain 43. A connection similar to that between the rotating motor 24 and the shaft 44 (not shown) is employed to connect the motor 23 with shaft 22, if desired, but this is not necessary. The connections between 44 and 41 include a worm gear.

The weight of the heavy segment 14 and connected parts, on the opposite side of the tilting pivot or bearing is sufficient to counterbalance the weight of the table 8, but when heavy work is mounted on the table considerable strain is placed upon the gears and the operating parts in tilting the table, and undesirable results have resulted from this strain. To overcome this a member 45 heavily weighted is positioned about opposite the end of the table bearing 9 and the rocking pivot of the segments on radial lines substantially parallel with said table bearing. This is secured to the segments at its ends near the peripheries of said segments and acts as a counterbalance for the table and the work thereon. It also serves to brace and strengthen the segments and prevent them from being twisted or otherwise distorted by the strain placed upon them.

In machines built for relatively light work the tilting motor 23 and its transmission may be omitted and hand operating means (not shown) for the shaft 22 and gear 21, operating the segment racks 20, such as a crank or hand wheel, substituted.

The short bearing shaft 36 has keyed to its outer end a gear 46 which is driven by the small gear 40 and on its inner end has the mitre gear 19 which meshes with the mitered rack 18 of the table for rotating the table in all positions to which it may be tilted. It will be understood that the character of the gears connecting the power units with the segment rack and table is not important, except that variable speed gears should be employed to vary the speed of movement of the work and adjust it to give the workmen time to do the necessary welding before the work is moved from their convenient reach. A worm gear, such as that shown in Fig. 2, is also desirable for the rotating drive, and for the tilting drive, particularly when it is manually operated. This prevents the table from over-rotating when it is moved and from having free movement at any time, which would interfere seriously with welding operations.

Figure 4:
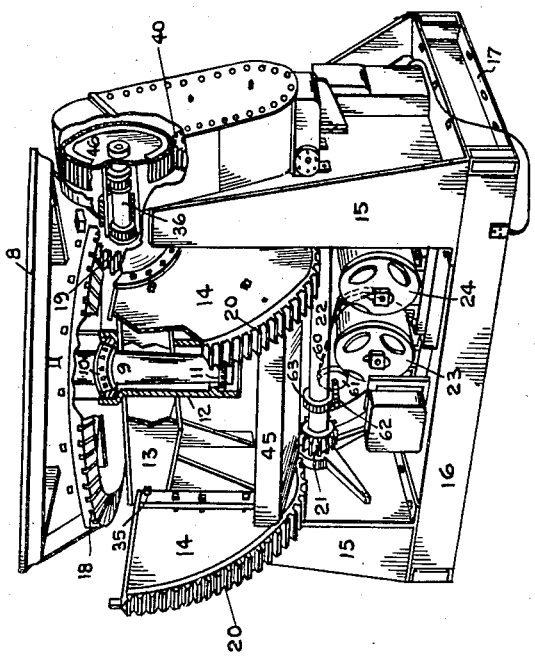
Fig. 4 is a rear perspective of the main driving head of Fig. 1 with certain outer parts broken away.

In the modification shown in Fig. 2, the operating head 47 comprises a hollow frame 48 and base 49 similar to the corresponding parts of Fig. 4, and a sleeve 50 in which the table 51 has its bearing at the top. In this form no swinging movement of the table is provided, as the head is intended to be used primarily with the auxiliary head 25 both mounted on the tilting base frame 1. Means for rotating the table 51, and from it through the work the table 26, are provided within the frame or housing in the form of a motor (not shown) connected by a belt 52 with a pulley 53 on a shaft 54 having a worm gear 55 thereon meshing with the complemental gear 56 on the shaft 57. On the opposite end of the shaft 57 is a small gear 58 in mesh with the annular gear 59 on the table 51.

Worm gears are shown in the embodiment of Fig. 4, in which the chain 60 is driven by the motor 23 and drives the sprocket 61 having a worm gear 62 on its shaft which meshes with the gear 63 on shaft 22.

I claim:

1. In a mechanism of the kind indicated, a table mounted for rotation and having means thereon at various points in its area for securing work thereto, a pivot member to which said table is fixed centrally for rotation, a bearing in which said pivot member is mounted to rotate, a yoke by which said bearing is carried, side frames in which said yoke is mounted at its ends to rock on a horizontal axis, segment gears fixed to said yoke on either side of said bearing and spaced therefrom for rocking the same, said pivot member and table, a connecting member fixed to said segment gears inside the teeth thereof, spanning the space between them, positioned beyond said pivot member and extending on both sides thereof but substantially in line therewith radially of the yoke's horizontal axis, said connecting member being weighted to exceed the weight of the table and adapted to urge said table and work thereon to move to horizontal from all other positions by gravity.

2. In a mechanism of the kind indicated, a table mounted for rotation and having means thereon at various points in its area for securing work thereto, a pivot member to which said table is fixed centrally for rotation, a bearing in which said pivot member is mounted to rotate a yoke by which said bearing is carried, side frames in which said yoke is mounted at its ends to rock on a horizontal axis, segment gears fixed to said yoke on either side of said bearings and spaced therefrom for rocking the same, said pivot member and table, a connecting member fixed to said segment gears inside the teeth thereof, spanning the space between them, positioned beyond said pivot member and extending on both sides thereof but substantially in line therewith radially of the yoke's horizontal axis, said connecting member being weighted to balance the weight of the table and adapted to urge said table and work thereon to move to uppermost from all other positions by gravity, and means for tilting said yoke, pivot and table comprising a power shaft, a worm gear and a gear in mesh with one of said segment gears, whereby the parts so tilted are automatically held against free oscillation in all positions to which they may be tilted.

3. In a mechanism of the kind indicated, a table mounted for rotation and having means thereon at various points in its area for securing work thereto, a pivot member to which said table is fixed centrally for rotation, a bearing in which said pivot member is mounted to rotate, a yoke by which said bearing is carried, side frames in which said yoke is mounted at its ends to rock on a horizontal axis, segment gears fixed to said yoke on either side of said bearing and spaced therefrom for rocking the same, said pivot member and table, a weighted member rigidly connected with said gears located beyond said pivot member and extending laterally thereof, means for tilting said table comprising a power unit, variable speed and transmission means operatively connected with and mounted in fixed location beneath the table when it is in horizontal position, within said side frames and below said yoke, and a bottom base member upon which said tilting means and side frames are supported and to which said frames and power unit are rigidly secured, the said base and frames forming a rigid three sided frame unit for supporting all the parts herein specified.

4. In a mechanism of the kind indicated, a table mounted for rotation and having means thereon at various points in its area for securing work thereto, a pivot member to which said table is fixed centrally for rotation, a bearing in which said pivot member is mounted to rotate, a yoke by which said bearing is carried, side frames in which said yoke is mounted at its ends to rock on a horizontal axis, segment gears fixed to said yoke on either side of said bearing and spaced therefrom for rocking the same, said pivot member and table, a weighted member rigidly connected with said gears located beyond said pivot member and extending laterally thereof, means for tilting said table and for rotating the same comprising power units, variable speed and transmission means operatively connected with and mounted in fixed location beneath the table when it is in horizontal position, within said side frames and below said yoke, and a bottom base member upon which said tilting and rotating means and side frames are supported and to which said frames and power units are rigidly secured, the said base and frames forming a rigid three sided frame unit for supporting all the parts herein specified.

5. In a mechanism of the kind indicated, a table mounted for rotation and having means thereon at various points in its area for securing work thereto, a pivot member in which said table is fixed centrally for rotation, a bearing in which said pivot member is mounted to rotate, a yoke by which said bearing is carried centrally, a side frame in which said yoke is mounted at its ends to rock on a horizontal axis, segment gears fixed to said yoke on either side of said bearing and spaced therefrom for rocking the same, said pivot member and table, a connecting member fixed to said segment gears inside the teeth thereof, spanning the space between them, positioned beyond said pivot member but substantially in line therewith radially of the yoke's horizontal axis of rotation and at a greater distance from said axis than that of the table, said connecting member being weighted to exceed the weight of the table and adapted to urge said table and work thereon to move to horizontal from all other positions by gravity.

JOHN P. FABER.